United States Patent [19]
Yamamoto

[11] Patent Number: 5,625,336
[45] Date of Patent: Apr. 29, 1997

[54] DISPLAY APPARATUS FOR A BICYCLE HAVING A SPEED CHANGER

[75] Inventor: Seiji Yamamoto, Sakai, Japan

[73] Assignee: Shimano, Inc., Osaka, Japan

[21] Appl. No.: 301,530

[22] Filed: Sep. 7, 1994

[30] Foreign Application Priority Data

Sep. 8, 1993 [JP] Japan .................................. 5-222979

[51] Int. Cl.$^6$ .................................................. G04B 47/00
[52] U.S. Cl. .......................... 340/432; 340/439; 340/441;
340/309.15; 340/309.3; 340/309.4; 368/10
[58] Field of Search .......................... 340/432, 438,
340/439, 441, 309.15, 309.3, 309.4, 309.5,
984; 368/10, 69, 70, 82, 188, 22

[56] References Cited

U.S. PATENT DOCUMENTS

| | | | |
|---|---|---|---|
| 4,490,127 | 12/1984 | Matsumoto | 474/110 |
| 4,780,864 | 10/1988 | Houlihan | 368/10 |
| 4,859,984 | 8/1989 | Romano | 340/432 |
| 4,862,395 | 8/1989 | Fey et al. | 340/432 |
| 4,887,249 | 12/1989 | Thinesen | 368/10 |
| 5,226,022 | 7/1993 | Thinesen | 368/70 |

FOREIGN PATENT DOCUMENTS

| | | |
|---|---|---|
| 2601130 | 1/1988 | France . |
| 57-198185 | 12/1982 | Japan . |

*Primary Examiner*—Jeffery Hofsass
*Assistant Examiner*—Edward Lefkowitz
*Attorney, Agent, or Firm*—James A. Deland

[57] ABSTRACT

A display apparatus for a bicycle having a speed changer includes a display (10) switchable between a running mode for displaying running information such as time, running speed or running distance, and a shifting mode for displaying shifting information such as a speed stage of the speed changer; a switch and sensors (7a, 7b, 17) for generating a command to switch the display from the running mode to the shifting mode; and an automatic mode change device (12a, 12f) for automatically switching the display from the shifting mode to the running mode. The automatic mode change device includes a control unit (12a) and a timer (12f). The control unit transmits the shifting information in place of the running information to the display device in response to a signal from the sensor or switch. The timer starts measuring time in response to the signal from the sensor or switch. Upon lapse of a predetermined time (t), the control unit transmits the running information in place of the shifting information to the display.

12 Claims, 7 Drawing Sheets

(1st Auto Change Mode)

(3st Auto Change Mode)

DISPLAY APPARATUS FOR A BICYCLE HAVING A SPEED CHANGER

BACKGROUND OF THE INVENTION

1. Field of the Invention

The present invention relates to a display apparatus for a bicycle having a speed changer. Specifically, the display apparatus has a display device switchable between a running mode for displaying running information such as time, running speed or running distance, and a shifting mode for displaying shifting information such as a speed stage of the speed changer. The display apparatus also has a switch for generating a command to switch the display device from the running mode to the shifting mode.

2. Description of the Related Art

A conventional display apparatus for a bicycle as noted above is disclosed in Japanese Patent Publication Kokai No. 57-198185, for example. This apparatus has a numeric display device, and a plurality of key switches for switching information shown on the display device. When a selected one of the key switches is depressed, the display device is switched to a running mode to provide a digital display of running information such as running speed or running time, or to a shifting mode to display shifting information such as a speed stage. From the shifting information given on the display device the cyclist can ascertain a current shift position of the speed changer to effect a shifting operation correctly. The running information displayed allows the cyclist constantly to cheek a current running speed, or a running distance or running time from a starting point. Thus, the eyelist may pedal the bicycle while constantly adjusting the running speed or running distance, or an expected time of arrival at the destination, or a difference between these specifies and a schedule or target.

With the conventional apparatus, it is necessary, after a shifting operation is effected with the display device switched to the shifting mode to provide shifting information, to switch the display device from the shifting mode to the running mode to display running information in place of the shifting information. That is, each time a shifting operation is completed, the cyclist must take the trouble of effecting a switching operation to reinstate the display device in the running mode.

SUMMARY OF THE INVENTION

An object of the present invention is to provide a display apparatus for a bicycle which displays shifting information and running information with a relatively simple operation.

To fulfill the above object, the present invention provides an improvement on the conventional display apparatus for a bicycle having a switching command generating device for generating a command to switch the display device from the running mode to the shifting mode. The display apparatus according to the present invention includes an automatic mode change device for automatically switching the display device from the shifting mode to the running mode upon lapse of a predetermined time after switching of the display device to the shifting mode.

With this construction, an estimated time required for carrying out a shifting operation, for example, is made the above predetermined time, and the switching command generating device effects mode switching in time of the shifting operation. Then, during the shifting operation, the display device operating in the display mode for displaying running information is switched to the display mode for displaying shifting information (e.g. a speed stage). Upon completion of the shifting operation, the display device, under control of the automatic mode change device, switches block to the running mode to display running information (e.g. running speed).

When the switching command generating device is operated to effect mode switching without a shifting operation, the display device is forcibly switched from the running mode to the shifting mode to display shifting information. This enables the cyclist to know a current speed stage of the speed changer. Besides, upon lapse of the above predetermined time after the mode switching, the display device automatically returns to the running mode to display the running information.

The shifting information is made available on the display device when a shifting operation is carded out or when the cyclist wishes to know a current speed stage. During a normal run, the display device provides running information. Thus, running adjustment may be made by effecting shifting operations properly and promptly based on the correct knowledge of a shift position of the speed changer or drive device, running speed, running distance or time. This provides the advantage of enabling a bicycle run facilitating fulfillment of a schedule or target.

Further, since a change is made automatically from the shifting mode to the running mode, the only operation required is one for switching from the running mode to the shifting mode.

Other features and advantages of the invention will be apparent from the following description of the embodiments taken with reference to the drawings.

DETAILED DESCRIPTION OF THE PREFERRED EMBODIMENTS

Figure 1:
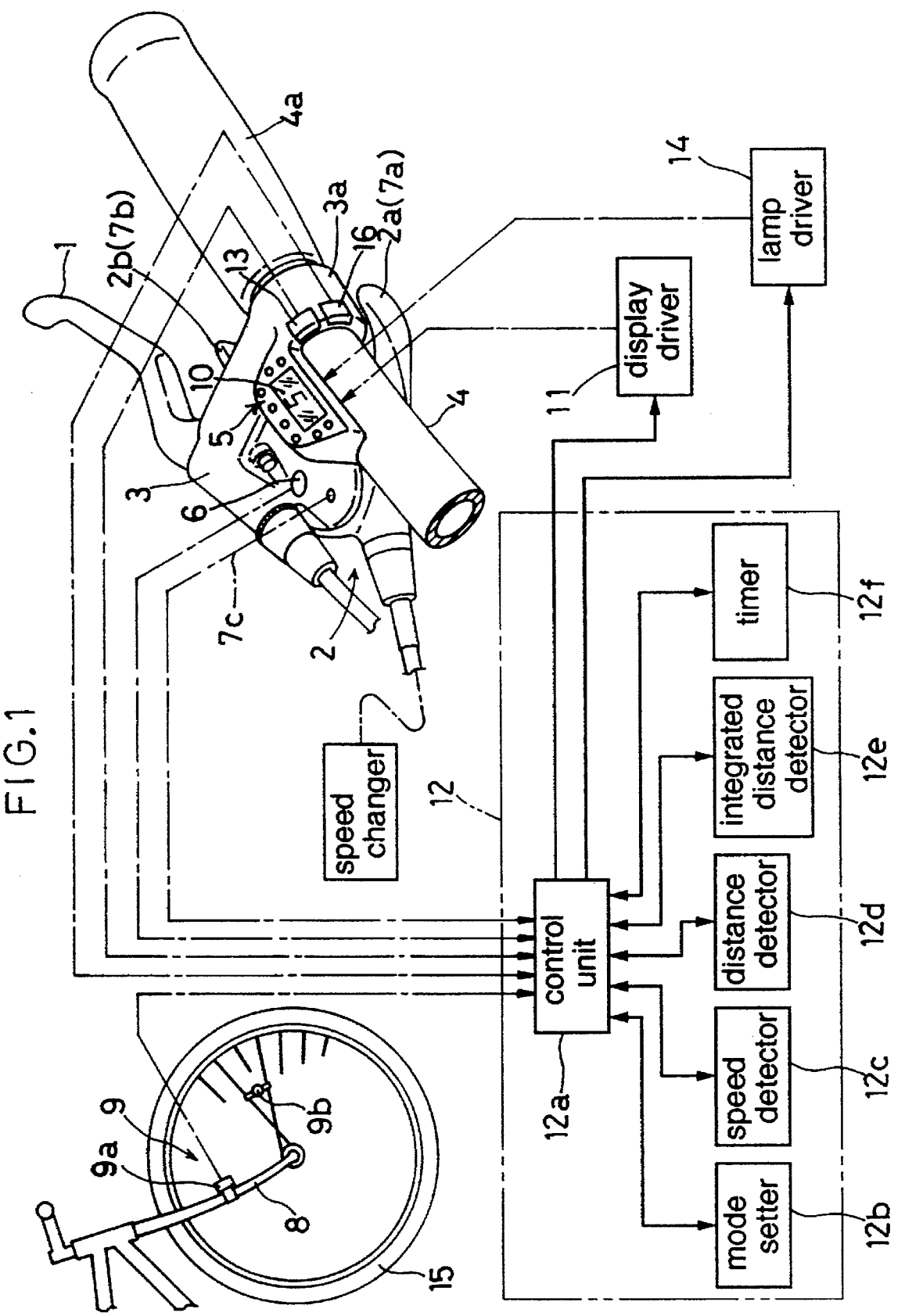
FIG. 1 is a schematic view of an entire display apparatus for a bicycle according to the present invention.

As shown in FIG. 1, a brake lever 1 and a shifting device 2 are attached to a handlebar 4 through a lever bracket 3. A display apparatus for a bicycle according to the present invention includes a display panel 5 having a liquid crystal display 10, a speed stage sensor 6 mounted on the shifting device 2, a rotation detector 9 including a rotation sensor 9a attached to a front fork 8 of the bicycle, a drive circuit 11 for driving the liquid crystal display 10, and a control device 12 for processing signals received from the sensors 6 and 9a and outputting signals to the drive circuit 11 and the like.

The speed stage sensor 6 detects speed stages of a speed changer (which is shown only schematically, and may be a front derailleur, a rear derailleur or, a self-contained speed changer) operable by the shifting device 2. The detection is based on positions of a take-up element (not shown) for winding a control cable of the shifting device 2. The speed stage sensor 6 outputs results of detection as electric signals to the control device 12.

The rotation detector 9 includes, besides the rotation sensor 9a, a detected object 9b attached to spokes of a front wheel 15. The rotation sensor 9a outputs a pulse signal to the control device 12 each time the detected object 9a moves past the rotation sensor 9a with rotation of the front wheel 15.

The shifting device 2 includes a first shift lever 2a for rotating the take-up element in a direction to unwind the control cable, and a second shift lever 2b for rotating the take-up element in a direction to wind the control cable. A shift start detector may be provided which detects start of a shifting operation based on variations in the electrostatic capacity of the shift levers per se occurring when touched by a hand, and outputs detection signals to the control device 12. Instead of the above, the first shift lever 2a may have a contact sensor 7a and the second shift lever 2b a contact sensor 7b, these contact sensors 7a and 7b detecting start of a shifting operation when a hand touches the shift levers 2a and 2b, and outputting detection results as electric signals to the control device 12. Both of the shift start detecting methods may be employed, but only the contact sensors 7a and 7b are used in this embodiment.

Figure 2:
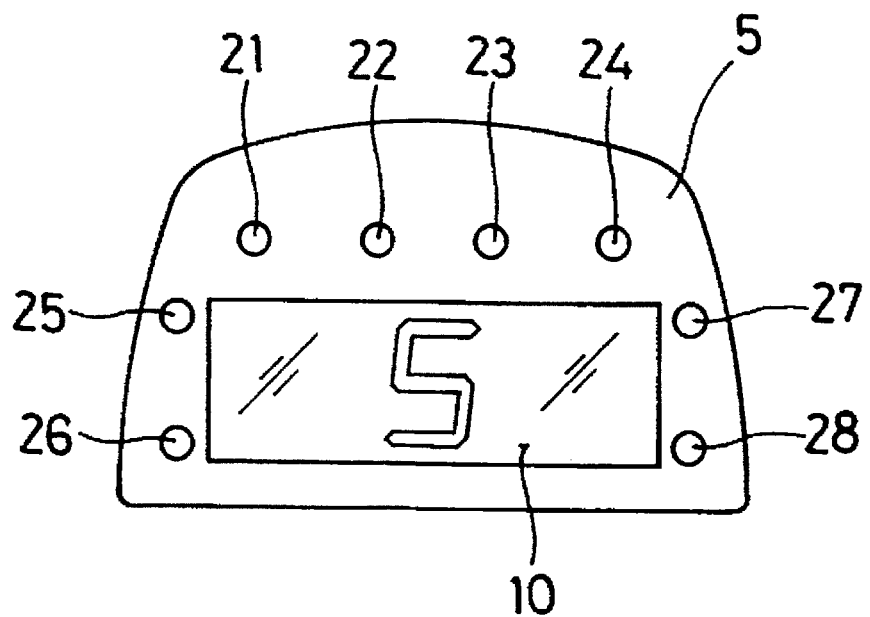
FIG. 2 is an explanatory view of a display panel showing a speed stage.

The control device 12 includes a microcomputer programmed to provide a control unit 12a, a display mode setter 12b, a running speed detector 12c, a running distance detector 12d, an integrated distance detector 12e and a timer 12f. A push-button type mode selector switch 13 is disposed on a mounting band 3a of the lever bracket 3. Based on information from this switch 13 and information from the contact sensors 7a and 7b inputted through an interface circuit 7c, the display 10 is controlled in predetermined display modes as described in detail later. The display panel 5 includes mode indicator lamps 21–28 as shown in FIG. 2. The control device 12 transmits operating signals to a drive circuit 14 to control the indicator lamps 21–28. As a result, one of the mode indicator lamps 21–28 is lit to indicate a display mode selected for the display 10.

The control unit 12a and running speed detector 12c count and carry out computational processing of the pulse signal from the rotation sensor 9a to detect a running speed of the bicycle. The control unit 12a and running distance detector 12d count and carry out computational processing of the pulse signal from the rotation sensor 9a to detect a running distance of the bicycle from a detection starting point. The detected running distance is stored in the running distance detector 12d. Further, the control unit 12a and integrated distance detector 12e count and carry out computational processing of the running distances detected by the running distance detector 12d, to detect an integrated distance from the detection starting point. The detected integrated distance is stored in the integrated distance detector 12e.

Each time the mode selector switch 13 is operated, the control device 12, based on the information from the selector switch 13, causes the mode setter 12b to establish one of a first to a third auto change modes, a speed stage mode, a running speed mode, a running distance mode, an integrated distance mode and a time mode. Then, the control unit 12a transmits signals to the drive circuits 11 and 14 to cause the display 10 to show information in a selected display mode, and to light one of the mode indicator lamps 21–28 corresponding to the selected display mode. The control unit 12a acts also as a mode changing device as described hereinafter.

Figure 3:
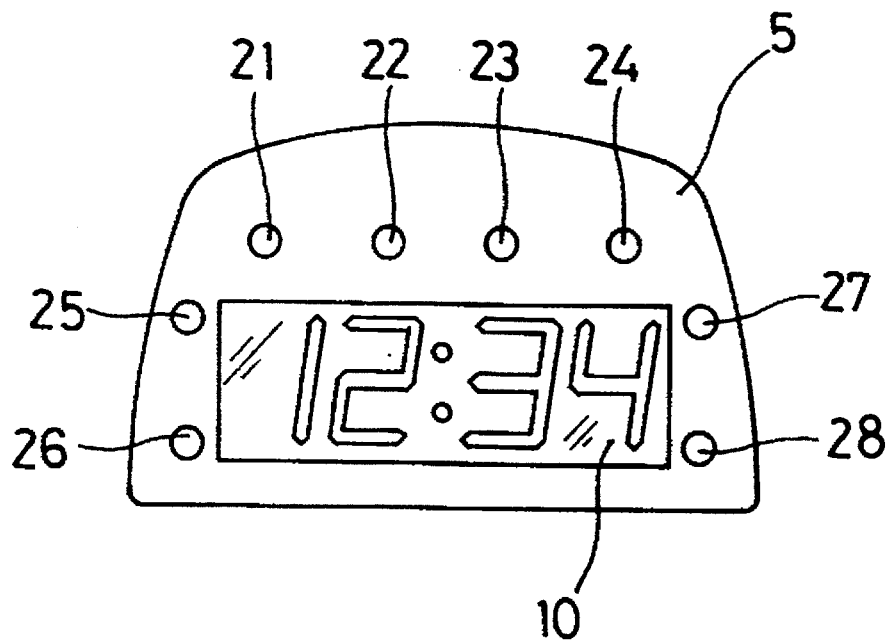
FIG. 3 is an explanatory view of the display panel showing time.
Figure 4:
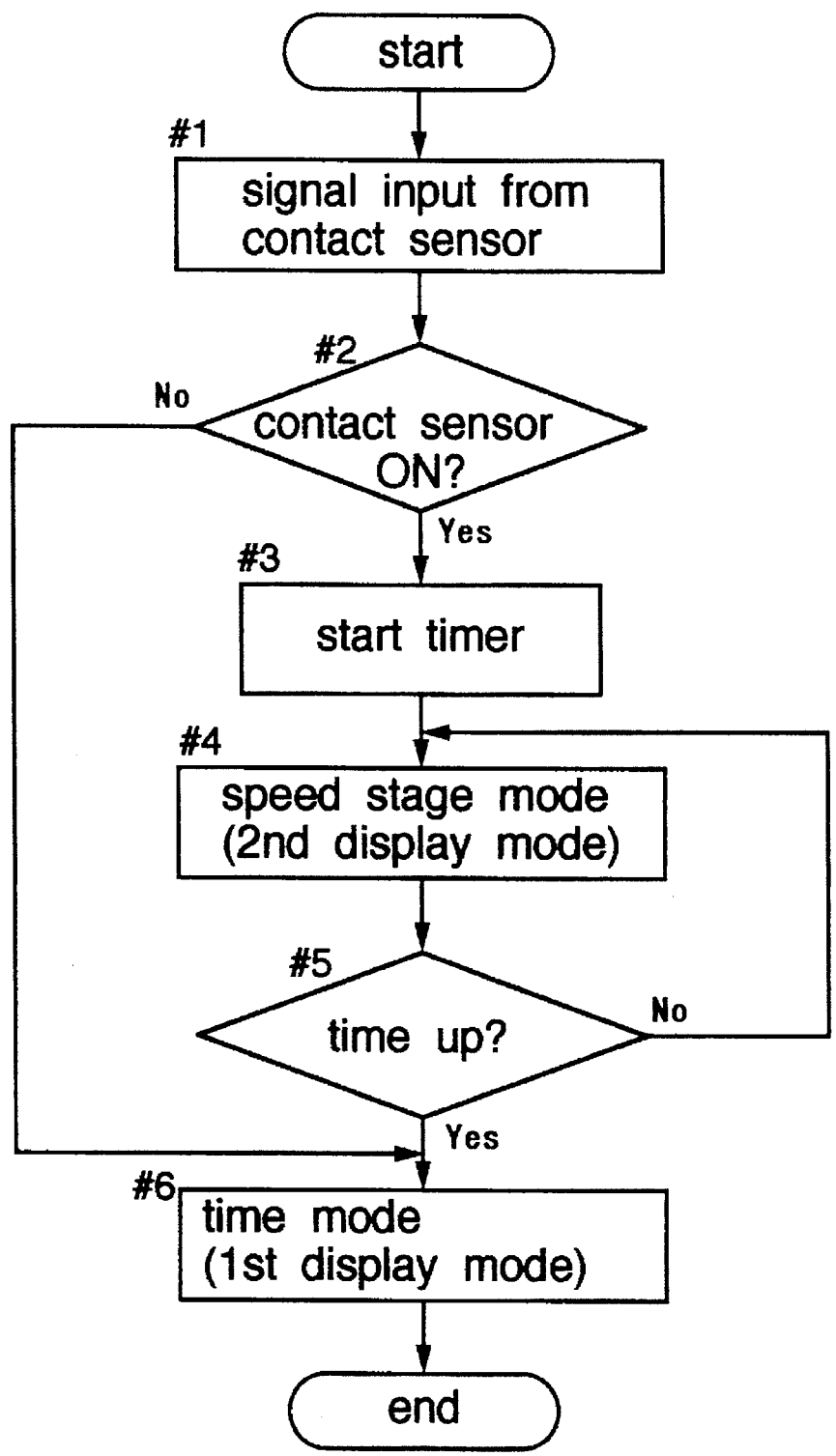
FIG. 4 is a flowchart of control processing in a first auto change mode.

When the first auto change mode is selected through the mode selector switch 13, the control unit 12a outputs a lighting signal to the drive circuit 14 to light a first auto change mode indicator lamp 21. Consequently, the mode indicator lamp 21 is lit to indicate the first auto change mode. Then, the control device 12 operates according to the flowchart shown in FIG. 4. First, a signal is inputted from the contact sensor 7a or 7b (#1). If, at this time, the cyclist touches the contact sensor 7a or 7b to operate the shift lever 2a or 2b (#2), the speed stage mode is started. Then, the control unit 12a cooperates with the timer 12f to start measuring time (#3). At the same time, control processing is effected in the speed stage mode (#4). In this processing, as will be described in detail later, the control unit 12a, based on the signal from the contact sensor 7a or 7b, outputs a signal to the drive circuit 11 for displaying a speed stage. As a result, the display 10 is switched to the speed stage mode to give a digital display of a speed stage, as shown in FIG. 2, which is detected by the speed stage sensor 6. Subsequently, checking is made whether a predetermined time "t" has elapsed or not (#5). If time is up, control processing is carded out in the time mode and the control unit 12a outputs a signal to the drive circuit 11 for displaying time, whereby the display 10 is switched to the time mode (#6). The predetermined time, preferably, corresponds to a period of time required for completion of an actual shift of the speed changer after start of an operation of the shift lever 2a or 2b, but may be set otherwise as desired. Consequently, as shown in FIG. 3, the display 10 is reinstated in the time mode to give a digital display of time. Thus, as soon as the shift lever 2a or 2b is touched, the display 10 is automatically switched from the time mode to the speed stage mode to display a current speed stage. When the shift lever is operated to a new speed position, a speed stage corresponding to that position is displayed. Thereafter the display 10 shows time. The above processing is the first auto change mode. When a shifting operation is effected, this mode displays a speed stage occurring before an actual operation of the speed changer and a speed stage established after the actual operation of the speed changer. Thus, the cyclist may carry out a shifting operation while observing, on the display 10, the speed stage occurring before the shifting operation and the speed stage established after the shifting operation. After the display 10 is switched to the speed stage mode, the cyclist may or may not shift the speed changer. In either case, the display 10 shows time again upon lapse of the predetermined time "t". The cyclist can continue to run while constantly checking time on the display 10 without taking the trouble of switching the display modes.

Figure 5:
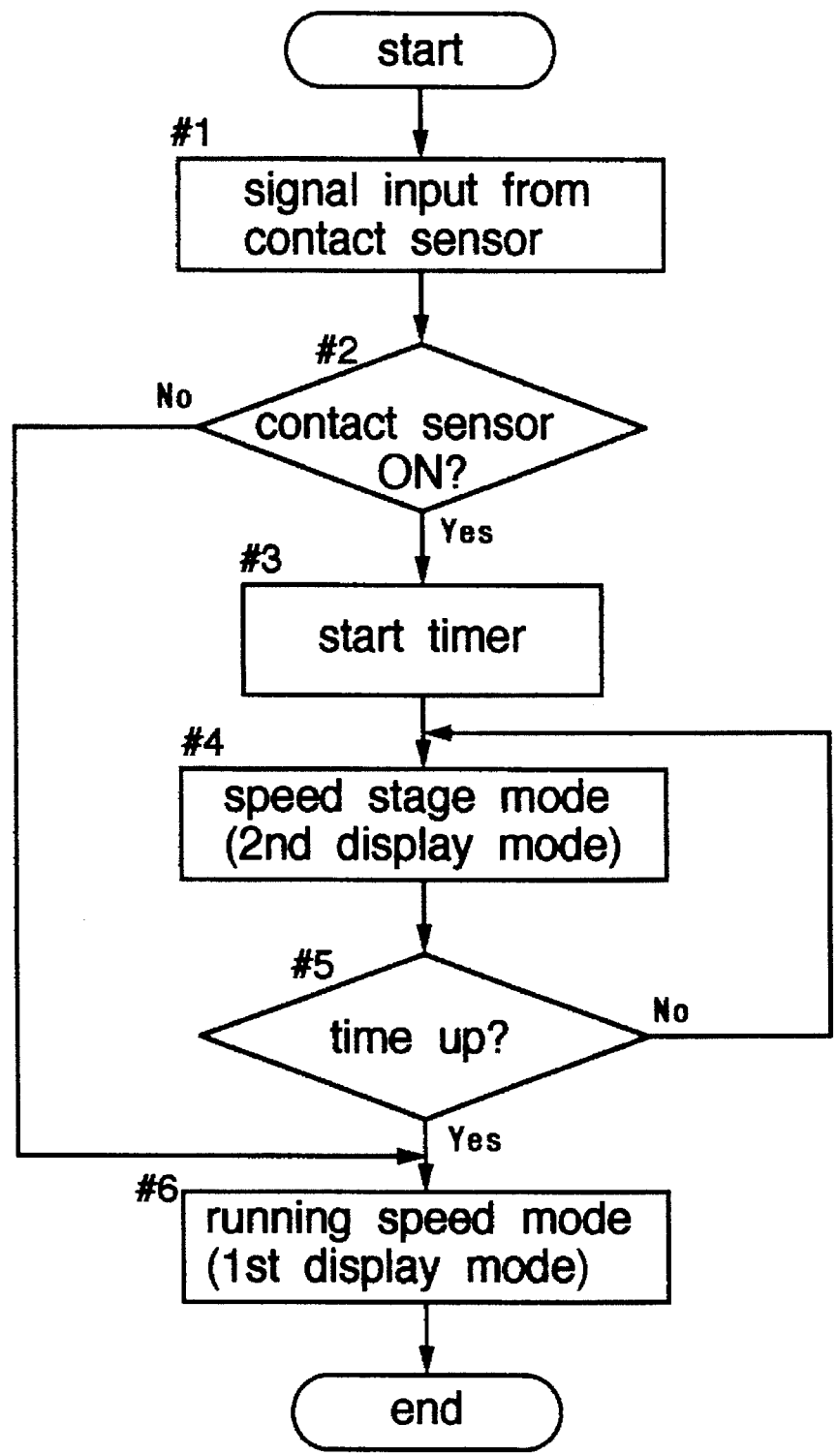
FIG. 5 is a flowchart of control processing in a second auto change mode.

When the second auto change mode is selected through the mode selector switch 13, the control unit 12a outputs a lighting signal to the drive circuit 14 to light a second auto change mode indicator lamp 22. Consequently, the mode indicator lamp 22 is lit to indicate the second auto change mode. Then, the control device 12 operates according to the flowchart shown in FIG. 5. First, a signal is inputted from the contact sensor 7a or 7b (#1). If, at this time, the cyclist touches the contact sensor 7a or 7b to operate the shift lever 2a or 2b (#2), the speed stage mode is started. Then, the control unit 12a cooperates with the timer 12f to start measuring time (#3). At the same time, control processing is effected in the speed stage mode (#4). Subsequently, checking is made whether the predetermined time "t" has elapsed or not (#5). If time is up, control processing is carded out in the running speed mode and the control unit 12a outputs a signal to the drive circuit 11 for displaying running speed, whereby the display 10 is switched to the running speed mode (#6). Consequently, the display 10 is reinstated in the running speed mode to give a digital display of running speed. Thus, as soon as the shift lever 2a or 2b is touched, the display 10 is automatically switched from the running speed mode to the speed stage mode to display a current speed stage. When the shift lever is operated to a new speed position, a speed stage corresponding to that position is displayed. Thereafter the display 10 displays running speed again. The above processing is the second auto change mode. In this mode, the display 10 displays running speed before a shifting operation is effected, a previous speed stage when the shifting operation is started, a new speed stage upon completion of the shifting operation, and then running speed again. Thus, the cyclist can continue to run while checking running speed, without taking the trouble of switching the display modes.

Figure 6:
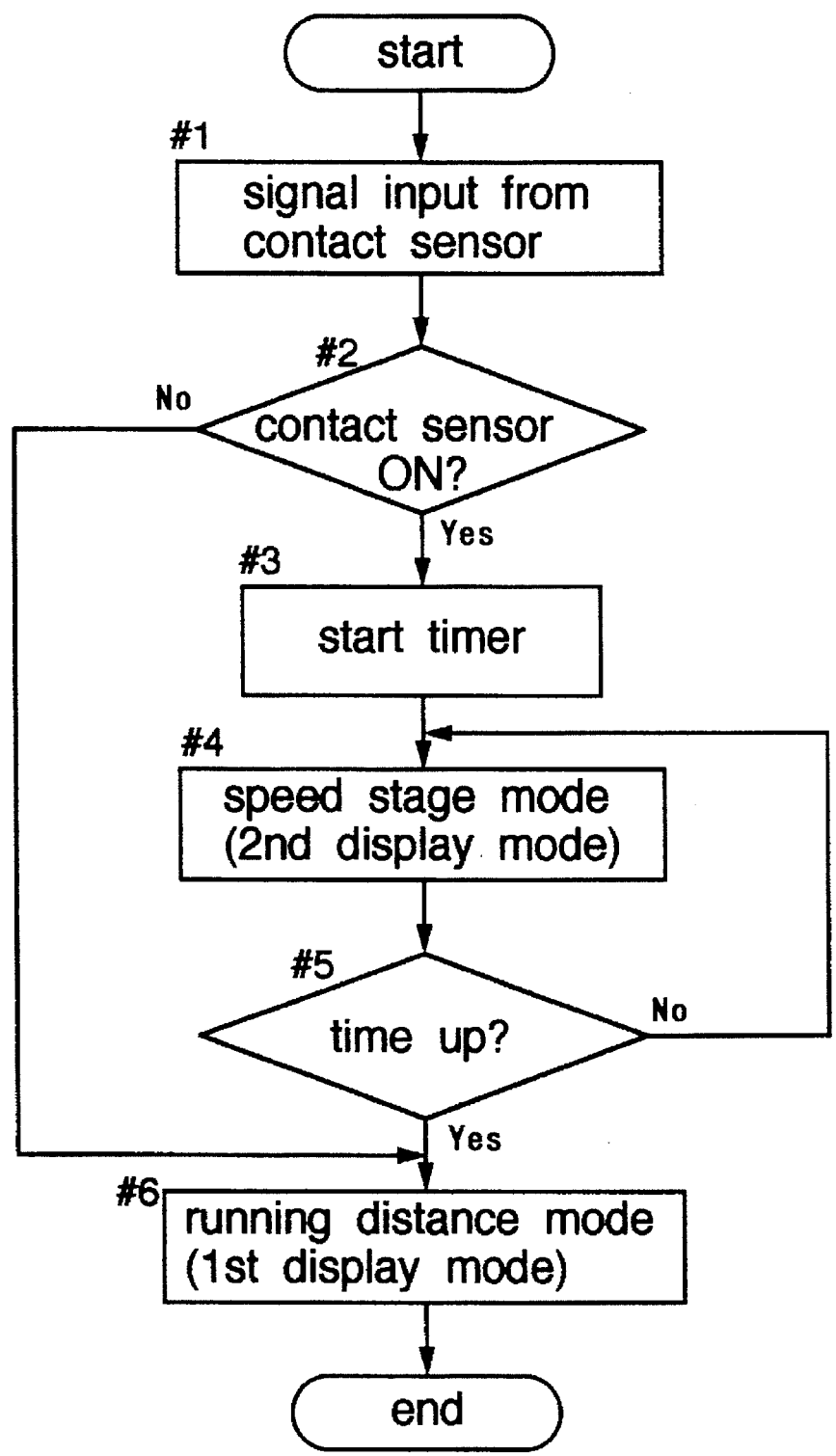
FIG. 6 is a flowchart of control processing in a third auto change mode.

When the third auto change mode is selected through the mode selector switch 13, the control unit 12a outputs a lighting signal to the drive circuit 14 to light a third auto change mode indicator lamp 23. Consequently, the mode indicator lamp 23 is lit to indicate the third auto change mode. Then, the control device 12 operates according to the flowchart shown in FIG. 6. First, a signal is inputted from the contact sensor 7a or 7b (#1). If, at this time, the cyclist touches the contact sensor 7a or 7b to operate the shift lever 2a or 2b (#2), the speed stage mode is started. Then, the control unit 12a cooperates with the timer 12f to start measuring time (#3). At the same time, control processing is effected in the speed stage mode (#4). Subsequently, checking is made whether the predetermined time "t" has elapsed or not (#5). If time is up, control processing is carded out in the running distance mode and the control unit 12a outputs a signal to the drive circuit 11 for displaying running distance, whereby the display 10 is switched to the running distance mode (#6). Consequently, the display 10 is reinstated in the running distance mode to give a digital display of running distance. Thus, as soon as the shift lever 2a or 2b is touched, the display 10 is automatically switched from the running distance mode to the speed stage mode to display a current speed stage. When the shift lever is operated to a new speed position, a speed stage corresponding to that position is displayed. Thereafter the display 10 displays running distance again. The above processing is the third auto change mode. In this mode, the display 10 displays running distance before a shifting operation is effected, a previous speed stage when the shifting operation is started, a new speed stage upon completion of the shifting operation, and then running distance again. Thus, the cyclist can continue to run while checking running distance, without taking the trouble of switching the display modes. In sum, the first auto change mode is a mode in which the display 10 shows a speed stage in place of time when a shifting operation is effected, and displays time again. The second auto change mode is a mode in which the display 10 shows a speed stage in place of running speed when a shifting operation is effected, and displays running speed again. The third auto change mode is a mode in which the display 10 shows a speed stage in place of running distance when a shifting operation is effected, and displays running distance again.

The control processing in the speed stage mode is as follows: Upon start of the speed stage mode, the control unit 12a outputs a signal to the drive circuit 14 for lighting a mode indicator lamp 24, whereby the mode indicator lamp 24 is lit to indicate the speed stage mode. Further, the control unit 12a outputs a signal to the drive circuit 11 to switch the display 10 to the speed stage mode. As a result, the display 10 gives a digital display of a speed stage detected by the speed stage sensor 6.

The control processing in the running speed mode is as follows: Upon start of the running speed mode, the control unit 12a outputs a signal to the drive circuit 14 for lighting a mode indicator lamp 25, whereby the mode indicator lamp 25 is lit to indicate the running speed mode. Further, the control unit 12a outputs a signal to the drive circuit 11 to switch the display 10 to the running speed mode. As a result, the display 10 gives a digital display of a running speed computed by the running speed detector 12c.

The control processing in the running distance mode is as follows: Upon start of the running distance mode, the control unit 12a outputs a signal to the drive circuit 14 for lighting a mode indicator lamp 26, whereby the mode indicator lamp 26 is lit to indicate the running distance mode. Further, the control unit 12a outputs a signal to the drive circuit 11 to switch the display 10 to the running distance mode. As a result, the display 10 gives a digital display of a running distance computed by the running distance detector 12d.

The control processing in the integrated distance mode is as follows: Upon start of the integrated distance mode, the control unit 12a outputs a signal to the drive circuit 14 for lighting a mode indicator lamp 27, whereby the mode indicator lamp 27 is lit to indicate the integrated distance mode. Further, the control unit 12a outputs a signal to the drive circuit 11 to switch the display 10 to the integrated distance mode. As a result, the display 10 gives a digital display of an integrated distance from a detection starting point computed by the integrated distance detector 12e.

The control processing in the time mode is as follows: Upon start of the time mode, the control unit 12a outputs a signal to the drive circuit 14 for lighting a mode indicator lamp 28, whereby the mode indicator lamp 28 is lit to indicate the time mode. Further, the control unit 12a outputs a signal to the drive circuit 11 to switch the display 10 to the time mode. As a result, the display 10 gives a digital display of time.

A push-button switch 16 shown in FIG. 1 is operable to reset the running distance detected by the running distance detector 12d and the integrated distance detected by the integrated distance detector 12e. This reset switch 16 and the mode selector switch 13 are arranged on the mounting band 3a of the lever bracket 3 to facilitate operation by a hand holding a grip 4a of the handlebar 4.

Figure 7:
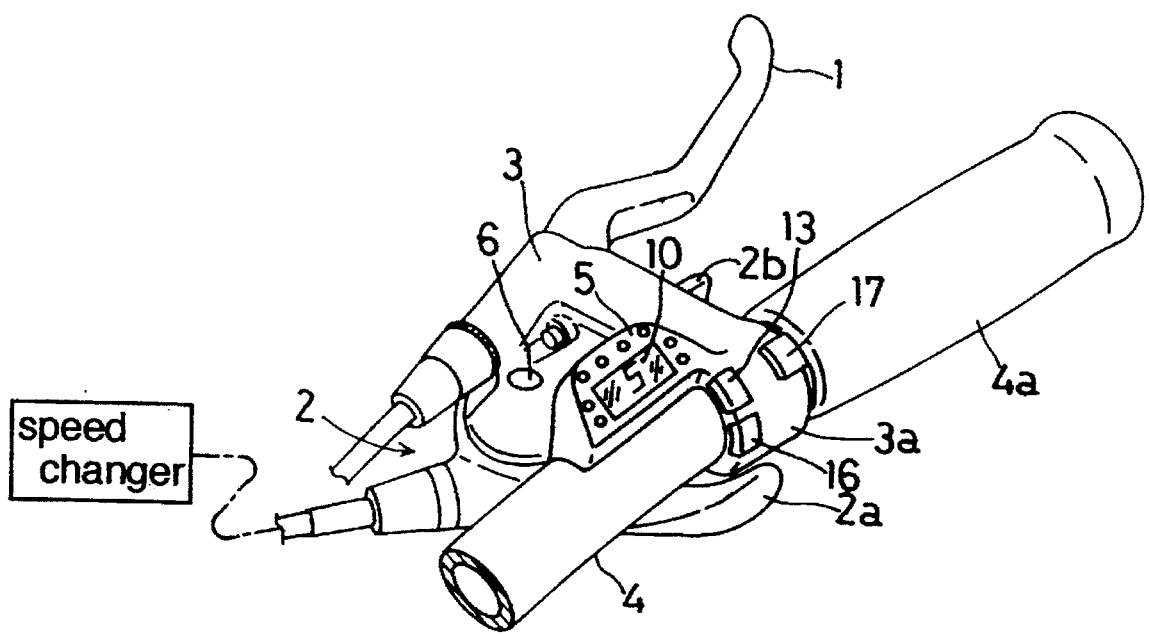
FIG. 7 is a perspective view of a modified construction for display mode switching.

FIG. 7 shows a modified construction for forcibly and temporarily switching the display 10 operating in one of the first to third auto change modes to a condition to display a speed stage at a desired moment.

A push-button type selector switch 17 is disposed on the mounting band 3a adjacent the grip 4a of the handlebar 4 to facilitate operation by a hand holding the handlebar 4. This selector switch 17 is connected to the control device 12. When the selector switch 17 is operated, whichever of the first to third auto change modes is selected for the display 10 at this time, the control device 12, in response to information from the selector switch 17, switches the display 10 to the speed stage mode to display a speed stage detected by the speed stage sensor 6. Upon lapse of the predetermined time "t" after the display 10 is switched to the speed stage mode, the control device 12 automatically reinstates the display 10 in the original display mode to display time, running speed or running distance.

The switch 17 for forcibly and temporarily switching the display 10 to the condition to display a speed stage is disposed adjacent the grip 4a of the handlebar 4 to facilitate operation by a hand holding the handlebar 4, as noted above. This may be achieved by attaching the switch 17 to a shift lever or to a position of the shifting device adjacent the handlebar grip. Instead of the above, the switch 17 may be mounted on the handlebar adjacent the grip independently of the shifting device and brake lever. The device for attaching this switch, including the mounting band 3a, is called herein a device 3a for attaching the switch adjacent the handlebar grip.

Figure 8:
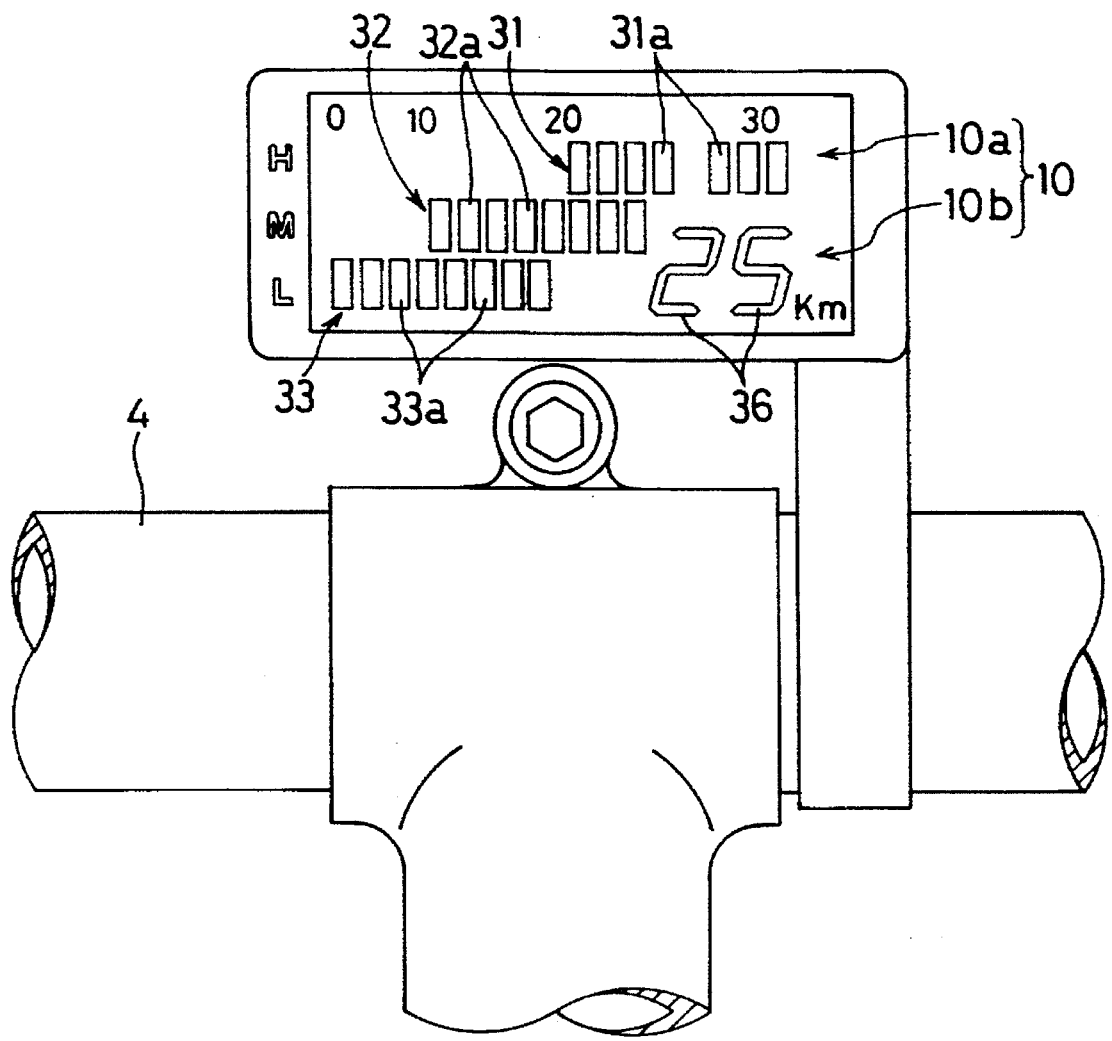
FIG. 8 is a front view of a modified display panel.

FIG. 8 shows a modified display 10 including a first display area 10a in the center of a liquid crystal display plane, and a second display area 10b in a lower fight section of the display plane. The first display area 10a has a plurality of blocks 31a, 32a and 33a arranged vertically and transversely. In the first display area 10a, only one of the blocks 31a, 32a and 33a is turned off, with all the other blocks 31a, 32a and 33a remaining lit, to indicate respective speed stages of a front derailleur and a rear derailleur. Specifically, a plurality of blocks 31a arranged transversely constitute a first block array 31 for indicating a high speed stage H of the front derailleur. A plurality of blocks 32a arranged transversely constitute a second block array 32 for indicating an intermediate speed stage M of the front derailleur. A plurality of blocks 33a arranged transversely constitute a third block array 33 for indicating a low speed stage L of the front derailleur. The blocks 31a, 32a, 33a themselves indicate the speed stages of the rear derailleur. The order of transverse arrangement of the blocks 31a, 32a or 33a corresponds to the order of speed stages of the rear derailleur. For example, the third block 31a, 32a or 33a from the left end in each block array 31, 32 or 33 indicates the third speed stage of the rear derailleur. As shown in FIG. 8, for example, when the fifth block 31a counted from the left end of the first block array 31 is turned off, the front derailleur is in the high speed stage and the rear derailleur in the fifth speed stage. Thus, the cyclist knows the speed stages of the front and rear derailleurs based on which block counted from the left end of which block array is turned off.

Figure 9:
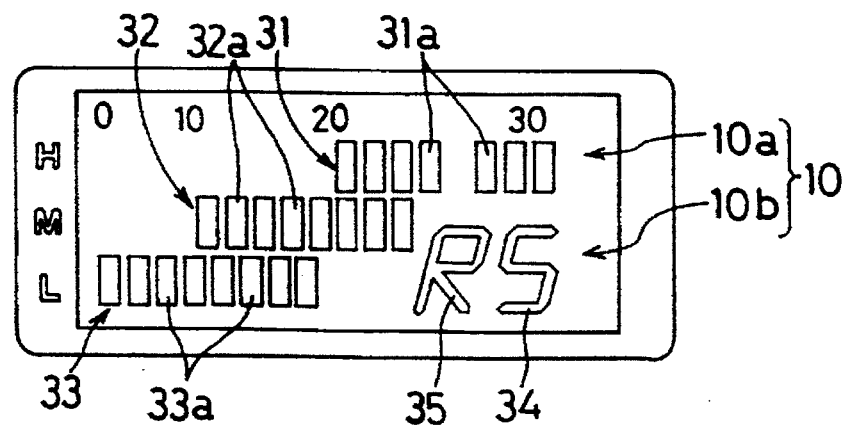
FIG. 9 is an explanatory view of a display made on the modified display panel.

The second display area 10b is automatically switchable between a mode for displaying running speed and a mode for displaying a speed stage of the front or rear derailleur. With operation of the contact sensor 7a or 7b or selector switch 17, the second display area 10b is automatically switched to the speed stage mode to give a digital display, in a numerical display 34 as shown in FIG. 9, of a speed stage detected by a speed stage sensor (not shown) of the front derailleur. Reference numeral 35 denotes an indication whether the speed stage displayed is of the front derailleur or rear derailleur. Upon lapse of the predetermined time "t" after the display mode switching, the second display area 10b is automatically switched to the running speed display mode to give a digital display, in a numerical display 36, of a running speed detected by the running detector.

The display apparatus may provide only the first to third auto change modes, discarding the speed stage mode, running speed mode, running distance mode, integrated distance mode and time mode. One or two of the first to third auto change modes may be employ .d. The number of teeth on a chainwheel engaging the drive chain, instead of a speed stage, may be displayed when the contact sensor 7a or 7b or selector switch 17 is operated. Thus, these displays are collectively called herein shifting information, and the mode of displaying the shifting information is called a shifting mode. What is displayed during a normal run of the bicycle may be an integrated distance, running time or altitude, aside from those described in the embodiments. Thus, these are collective called herein running information, and the mode of displaying the running information is called a running mode.

The foregoing embodiments have been described in relation to a two-lever type shifting device having separate shift levers for winding and unwinding the control cable. The present invention is applicable also to a bicycle having a single lever type shifting device for winding and unwinding the control cable with the same lever.

In the foregoing embodiments, the shift levers may comprise the capacitance type to act as the contact sensors. Various other detecting devices may be employed instead. For example, the shift levers may have, mounted on surfaces thereof, conductive rubber elements whose electric resistance is variable with a deformation under contact pressure, so that a contact is detected based on variations in the electric resistance.

What is claimed is:

1. A display apparatus for a bicycle having a speed changer, comprising:

a takeup element for winding a control cable;

a shifting device for rotating said takeup element, wherein said shifting device comprises shift levers adapted to be manipulated by a user;

display means switchable between a running mode for displaying running information and a shifting mode for displaying shifting information;

switching command generating means for generating a command to switch said display means from said running mode to said shifting mode, said switching command generating means including contact sensors provided to said shift levers so that manipulation of said shift levers causes said generation of said command; and automatic mode change means for automatically switching said display means from said shifting mode to said running mode upon lapse of a predetermined time after switching of said display means to said shifting mode.

2. A display apparatus as defined in claim 1, wherein said automatic mode change means includes a control unit and timer means, said control unit transmitting said shifting information in place of said running information to said display means in response to a signal from said switching command generating means, said timer means starting to measure time in response to said signal from said switching command generating means, and said control unit transmitting said running information in place of said shifting information to said display means upon lapse of said predetermined time.

3. A display apparatus as defined in claim 1, wherein said switching command generating means includes an electric switch disposed on a mounting element attached to a bicycle handlebar adjacent a grip thereof.

4. A display apparatus as defined in claim 1, wherein said shifting information is a speed stage of said speed changer.

5. A display apparatus as defined in claim 4, wherein said running information is time.

6. A display apparatus as defined in claim 4, wherein said running information is a running speed of said bicycle.

7. A display apparatus as defined in claim 4, wherein said running information is a running distance of said bicycle.

8. A display apparatus as defined in claim 1, further comprising running information selecting means for selecting said running information from time, running speed and running distance.

9. A display apparatus as defined in claim 8, wherein said running information selecting means comprises an electric switch disposed on a mounting element attached to a bicycle handlebar adjacent a grip thereof.

10. A display apparatus as defined in claim 1, wherein said switching command generating means generates said command in response to touching of said shifting device.

11. A display apparatus according to claim 1, wherein said switching command generating means generates said command in response to motion of said shifting device.

12. A display apparatus according to claim 1, wherein said shifting information comprises a speed stage of the bicycle.

* * * * *